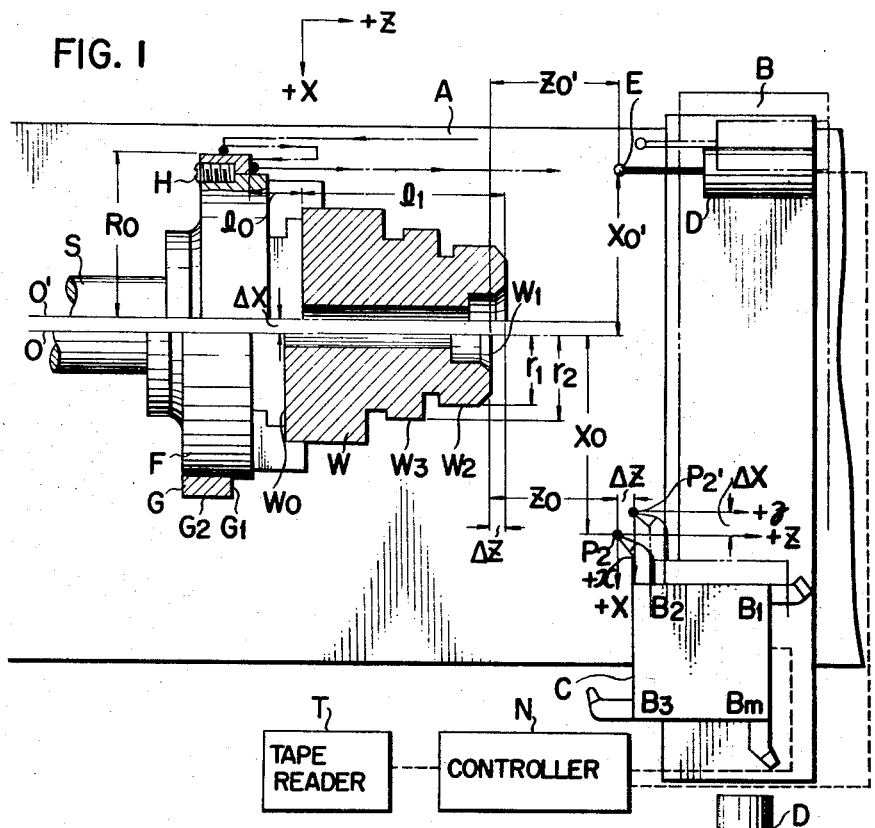
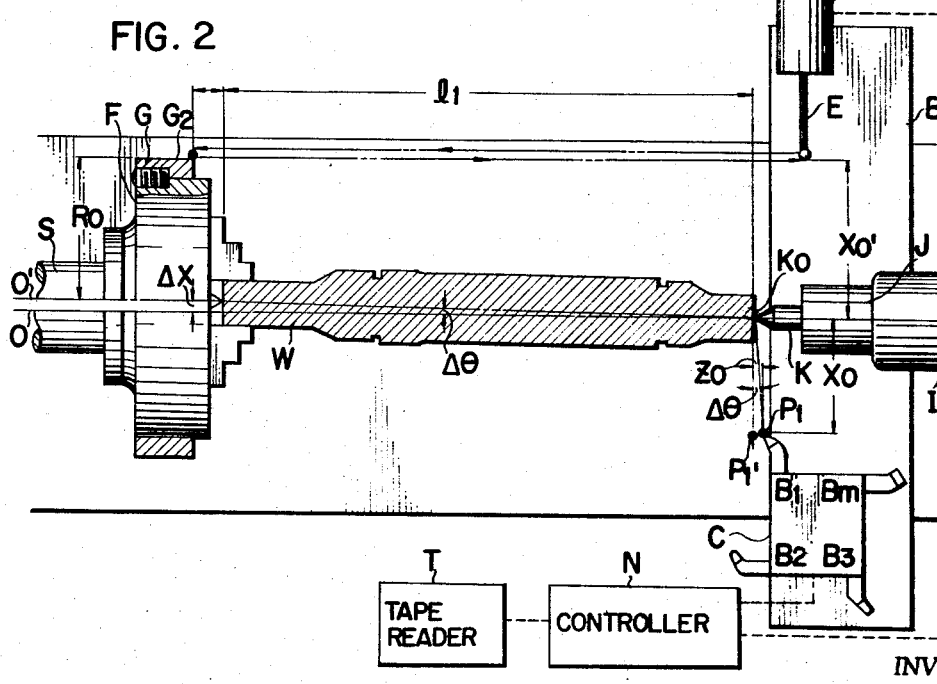

United States Patent Office 3,605,531
Patented Sept. 20, 1971

3,605,531
AUTOMATIC TOOL POSITION COMPENSATING SYSTEM FOR A NUMERICALLY CONTROLLED MACHINE TOOL
Tadayoshi Izumi and Hideo Hirokawa, Kawasaki, Japan, assignors to Ikegai Tekko Kabushiki Kaisha, Tokyo, Japan
Filed May 12, 1969, Ser. No. 823,893
Claims priority, application Japan, Aug. 29, 1968, 43/61,447, 43/61,448
Int. Cl. B23b 3/28
U.S. Cl. 82—14D
3 Claims

ABSTRACT OF THE DISCLOSURE

In a numerically controlled machine tool having a tool support slide, a multiple tool turret, a controller and a measuring element, a ring gauge is mounted on the main spindle of said machine tool coaxially thereto so that the deviations of said main spindle in X and Z directions may be accurately measured and compensated for. To do this, the measuring element utilizes the outer peripheral surface and the inwardly facing end surface of said ring gauge as the reference or standard positions in X and Z directions, respectively. The deviations are compensated in the succeeding cutting process for shifting the tools respectively, each in accordance with the error detected, by parallel shifting of the co-ordinate axis of the tools. Alternately, the axes may be shifted angularly, or the parallel shift may be combined with the angular shift of the co-ordinate axes.

---

The present invention relates to numerically controlled machine tools, and more particularly, to a system in such a machine for shifting the series of tools to compensate for errors.

When performing a cutting operation with a numerically controlled machine tool, such as a turret lathe, it is known that the accuracy of dimensions of the machined workpiece tends to deviate from the required dimensions as the cutting process progresses due to variations in the position of the cutting tool tip from the initial or basic position set on the tape reader. This deviation occurs due to the constant cutting force causing thermal deformation and/or progressive wear of the tool tip during the cutting operation. In order to avoid such deterioration of the accuracy of dimensions, an automatic tool position compensating system for a numerically controlled machine tool has been previously proposed in which a measuring element is provided on the tool slide of the machine. The measuring element carrys out a sequence of dimension measuring of the necessary machine portions by command signals issued from the tape reader based upon a measuring program previously determined. From this measuring, the deviations from the dimensions called for on the control tape are detected and the detected deviations are memorized in the controller in the form of digital values. When the workpiece is machined, the tools having the detected deviations are shifted to compensate for their deviation each by an amount equal to those memorized in the controller during the check time of the previous cutting operation. The detailed explanation of such a system can be found in the copending U.S. application Ser. No. 776,327, filed Nov. 18, 1968.

However, it has also been found that in the continuous cutting process where said process is extended for a long time, there are factors other than the deterioration of the accuracy of dimensions due to the deviations of the tool positions themselves as stated above that cause inaccuracies in the finished workpiece. That is, it is also inevitable that the center line of the main spindle of the machine or that of the workpiece displaces due to the generation of heat in the bearings, especially the main spindle bearings, meshing parts of the gears, clutches and other parts where moving parts interact to cause friction. Further, a change in the ambient temperature or change in temperature of the lubricating oil can cause the deleterious displacement along the centerline. The abovementioned prior system cannot compensate for the deterioration of the accuracy of dimension due to such a change in the position of the center line of the main spindle or the workpiece.

SUMMARY OF THE INVENTION

Accordingly, it is an object of the present invention to provide an automatic tool position compensating system for a numerically controlled machine tool wherein errors caused by displacement of the centerline of the workpiece are compensated.

It is another object of the present invention to provide such a system wherein to avoid the occurrence of the dimensional errors of a workpiece due to the deviation of the center of the main spindle of the machine or the workpiece caused by the heat generation in the machine parts, the deviations of the spindle are automatically checked and memorized or stored in a controller so that in the succeeding cutting process said deviations are applied to the respective tools for correction of their respective positions whereby the cutting process is accurately carried out.

It is another object of the present invention to provide an automatic tool position compensating system for a numerically controlled machine tool wherein there is provided an apparatus and method of avoiding the occurrence of the dimensional errors of a workpiece due to the displacement of the center line of the main spindle of the machine or the workpiece caused by the heat generation in the machine parts; the displacement of the center line of the main spindle being detected by a measuring element mounted on the tool slide and in response to which the original position of each tool is corrected by shifting the tool's co-ordinate axes in proportion to the displaced value whereby the accuracy of the machined dimension is automatically compensated.

In practice, the automatic tool position compensating system of the present invention forms an integral part of a numerically controlled machine tool, such as a turret lathe. When the center line of the main spindle or the workpiece does not correctly coincide with that originally set, the deviation is checked by the measuring element on the tool slide of the machine by cooperation with a ring gauge secured to the main spindle or chuck mounted thereon. The dimensional deviations of the workpiece in the direction of the longitudinal axis of the main spindle (called the Z direction) and in the transverse direction to the axis (called the X direction) are measured at the outer peripheral surface and the end surface of the ring gauge, which serve as standard positions respectively. In other words, these surfaces serve as the measuring origins of the measuring element in Z and X directions, respectively, and any deviations are detected by the measuring element and then memorized in the controller in the form of digital values corresponding to respective tool deviations. The stored digital values of deviation are then applied to the indexing signals for the respective tools in the succeeding cutting process to compensate or correct the positions.

According to another aspect of the present invention, the measuring element detects the deviations of the center line of the workpiece from the proper position and in response thereto in Z and X directions the controller shifts the co-ordinate axes of the tool in parallel with those originally set. Alternatively, the controller shifts the axes angularly about an original center, or shifts the axes in parallel and angularly simultaneously.

BRIEF DESCRIPTION OF THE DRAWINGS

Other objects and features of the present invention will be appreciated and become apparent as the present disclosure proceeds and upon consideration of the following detailed description taken in conjunction with the accompanying drawings wherein exemplary embodiments of the present invention are disclosed.

In the drawing:

FIG. 1 is a diagrammatical view of a numerically controlled machine tool, e.g. a turret lathe, illustrating a preferred embodiment of the apparatus and method of automatic tool position compensating system according to the present invention with the workpiece held in a chuck on the spindle;

FIG. 2 is a view similar to FIG. 1 when the machine tool is used with the workpiece held between the spindle and tail stock.

DESCRIPTION OF THE PREFERRED EMBODIMENT

Figure 3:
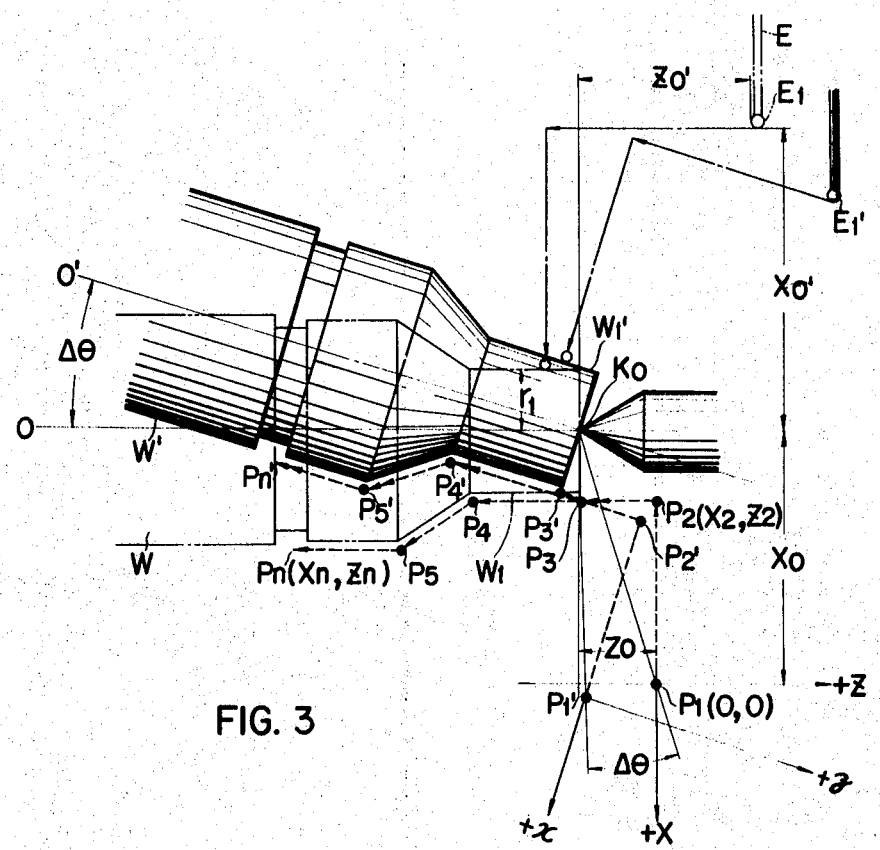
FIG. 3 shows a view of a portion of the workpiece in FIG. 2 on an enlarged scale.

In the system shown in FIG. 1, a numerically controlled turret lathe A includes a cross slide B and a turret C which has a series of tools $B_1$, $B_2$, $B_3$ ..., $B_m$ thereon. A measuring element D having a feeler E is mounted on the cross slide B opposite the turret C.

On a chuck F forming part of a chuck and spindle assembly comprised of the chuck F and the main spindle S of the lathe A and on which the chuck is mounted, is mounted a ring gauge G, such mounting being accomplished by means of a screw H, for example. The outer peripheral surface of the ring gauge G has a radius $R_0$ and constitutes the standard measuring surface in the X direction or transverse to the longitudinal axis O. Similarly, end surface $G_1$ of the ring gauge G which is at a distance $l_0$ from the base surface $W_0$ of the workpiece W constitutes the standard measuring surface in the Z direction or along the axis O.

Assuming that, due to the various factors resulting from the continuous machining operation for an extended time, the main spindle S deviates, e.g. $+\Delta Z$ and $-\Delta X$ in Z and X directions, respectively, then the rotational center line of the main spindle S displaces from axis O to displace axis O'.

In FIG. 1, below the center line or axis O there is shown the halves of the main spindle S and the workpiece W at their initially set location, while above the center line O' is shown the halves of the main spindle S and the workpiece W repositioned due to the shifts $+\Delta Z$ and $-\Delta X$ of the main spindle S in Z and X directions, respectively; such shifts being caused by the abovementioned causes. When the workpiece W that has been shifted from its center of rotation (from axis O to axis O') is turned or machined according to the program from the tape reader T by the tools $B_1$, $B_2$, $B_3$, ..., $B_m$ which have been initally precisely set so that their tip positions coincide with those previously programmed, the radii of the cylindrical portions $W_2$ and $W_3$ of the workpiece W are inaccurate, as before. That is, when said workpiece W is desired to be turned to have radii $r_1$ and $r_2$, respectively, the actual radii become $r_1+\Delta X$ and $r_2+\Delta X$, respectively, and the distance between the ends of the workpiece W or the length becomes $l_1-\Delta Z$.

Accordingly, to correct for this inaccuracy on the next cycle, the tip of the feeler E of the measuring element D is moved along a route, e.g. the dot-dash line shown in FIG. 3, to come into contact with the measuring fundamental surfaces $G_2$ and $G_1$ of the ring gauge G. This is accomplished by giving the measuring demand values $X_0'-R_0$ and $Z'+l_1+l_0$, respectively, in X and Z directions. When the feeler E is stopped at the surfaces $G_2$ and $G_1$, the deviation outputs corresponding to the deviations $-\Delta X$ and $+\Delta Z$, respectively, are obtained.

The deviation outputs of the measuring element D thus obtained are respectively memorized or stored at the designated positions in the deviation memories contained in the controller N as digital values after being converted by an A–D transducer. In this connection, reference should be made to the aforesaid copending U.S. application Ser. No. 776,327. The controller N decodes the programmed information fed in by the tape reader T, delivering numerical information and character or notation information respectively to a register and a miscellaneous function device, both also contained in the controller N. The information from in the miscellaneous function device is either delivered to the outside to index the turret C or regulate the revolution of the spindle S, or delivered together with the information from the register through a pulse interpolator, contained in the controller N, as digital pulses to drive servomotors so that the tools trace the respective indicated paths in order to regulate the feed speeds. Prior to the succeeding machining operations the digital deviations memorized in the deviation memories are delivered as the pulses to drive servomotors through a gate circuit operable by a programmed command from the miscellaneous function device and a pulse interpolator. Such a gate circuit and pulse interpolator are conventionally contained in such a controller N. The cross slide B is thereby shifted $-\Delta X$ and $+\Delta Z$ equal to the detected deviations to correct the positioning of the tools.

That is, for instance, in the case of turning or cutting by the tool $B_2$, the co-ordinate axes (X and Z) having an origin or reference point lying at tip $P_2$, transfer to new parallel co-ordinate axes ($x$ and $z$) whose origin thus lies at a tip point $P_2'$. Because of this relocation, the workpiece W can be turned as precisely as previously programmed according to the original cutting command signals from the tape reader T. That is, for example, even after the center of rotation of said workpiece W is shifted from O to O', the results of the turned portion $W_2$ by the tool $B_2$ are accurately obtained with the radius $r_1$.

Needless to say, the deviations of the tools due to other than that of relocation of the center of rotation, e.g. wear of the tip $P_2$, setting error, etc., are compensated by the actuation of the measuring element D to sense the turned portions $W_2$, $W_3$ based upon the program, as disclosed in the aforesaid pending application.

FIG. 2 shows diagrammatically the automatic measuring and the transformation of the co-ordinate axes in a center work set-up according to the present invention. The workpiece W is supported at one end by a chuck F and at the other end by a center K mounted to a shaft J of the tail stock I, as shown. It is assumed that the center line of the main spindle S shifts $-\Delta x$ from O to O' due to heating of the spindle S, for example, resulting from the continuous turning for an extended period. Since there occurs no thermal deviations in the center K, the axis of rotation of the work W tilts through $\Delta\theta$ about a center, the tip $K_0$ of the center K. Accordingly, when the work W is turned or machined by the tools $B_1$, $B_2$, $B_3$, ..., $B_m$, which have been previously precisely set in accordance with the program in the tape reader T, said workpiece W is turned to an undesirable conical shape. However, when the tip of the feeler E of the measuring element D is given a measuring demand signal $X_0'-R_0$ in the X direction (so that it is moved along a route, e.g. the dot-dash line shown in FIG. 2) by the command signals issued from the tape reader T so as to come into contact with the measuring standard position $G_2$ of the ring gauge G, the above-mentioned deviation $-\Delta X$ is detected.

The detected deviation outputs of the measuring element D are memorized as digital values at the designated positions in the deviation memories contained in the controller N. Prior to the succeeding cutting operations the deviation information $-\Delta X$ memorized in the deviation memories and the dimensional numerical information $l_0+l_1$ in Z-axis direction in the register contained in the controller N are used to calculate an inclination angle $$\Delta\theta = \tan^{-1} \frac{-\Delta X}{l_0+l_1}$$

For instance, in the case of the tool $B_1$, after the dimensional information has been converted based upon the formula, which will be explained in more detail later, according to the dimensional information $X_0$ and $Z_0$ for the tip $K_0$ of the center K of the tool tip $P_1$ and the calculated inclination angle $\Delta\theta$, the converted dimensional information is delivered to drive servomotors through the pulse interpolator contained in the controller N, so that the tip $P_1$ is rotated through the angle $\Delta\theta$ about the tip $K_0$ by shifts of the cross slide B to reach the point $P'$. The point $P_1'$ thus becomes the new origin of the tool path to be traced by the tool $B_1$.

FIG. 3 shows diagrammatically the rotation of the co-ordinate axes at the tail stock side of the lathe shown in FIG. 2 on an enlarged scale. When the rotation axis of the workpiece W coincides with the initially set axis O, the program proceeds with the tip $P_1$ of the tool $B_1$ moving along a proper route, e.g. $P_1(O,O)-P_2(X_2,Z_2) \ldots P_n(X_n,Z_n)$. The workpiece W being made with the tip $P_1$ thus has a shape shown by the dot-dash line. Succeedingly, the feeler E is moved along a route (e.g. the dot-dash line from the measuring origin $E_1$ based upon the measuring demand signals programmed), so that said feeler $E_1$ comes into contact with the surface $W_1$ to detect that there is no deviation between the measured dimension and the demand dimension $r_1$ commanded in this instance by the tape reader T.

However, when the rotation axis of the workpiece W shifts to axis $O'$, the co-ordinate axes $(X,Z)$ must be rotated (as a result of a preceding detecting operation by feeler E) through the angle $\Delta\theta$ about the point $K_0$, or the tip of the center K. As a result, the turning proceeds with basing upon the co-ordinate axes $(x,z)$ along a route, e.g. $P_1' \ldots P_2' \ldots P_3' \ldots P_n'$ according to the correction and the initially set program, fed to the controller N by the measuring element D and the tape reader T, respectively. This results in the workpiece $W'$ being turned to have a shape as previously programmed and desired, as shown by the solid line outline in FIG. 5.

The measuring origin of the feeler E may also be rotated through the angle $\Delta\theta$ equal to the rotation angle of the turning origin so that said feeler E shifts from the point $E_1$ to the point $E_1'$. Thus, in measuring, the feeler E is then moved along the heavy dot-dash line in the direction shown by the arrow to come into contact with the surface of the work $W'$ to now detect whether there is a deviation between the measured dimension and the radius $r_1$ initially programmed, for use on the next cycle.

In short, the tip $P_1$ of the tool $B_1$ in the embodiment shown in FIG. 3 is the origin of the programed tool path for the tool $B_1$, and the calculation and conversion of $X_0 \cos \Delta\theta + Z_0 \sin \Delta\theta - X_0$ and $Z_0 \cos \Delta\theta - X_0 \sin \Delta\theta - Z_0$ are made in the controller N by the rotation of the center line of the work W through the angle $\Delta\theta$, the converted dimensional information is delivered through the pulse interpolator, and the tip $P_1$ of the tool $B_1$ is shifted in X and Y directions according to values equivalent to the above converted values. Thus the origin $P_1'$ of the new tool paths after the angular displacement $\Delta\theta$ is determined.

In the succeeding machining operation, whenever the programed dimensional information $(X_1, Z_1)$ (wherein $i=2, 2, \ldots n$) of the tool paths is read by the tape reader $T_1$, the calculations of $X_i = X_i \cos (\widehat{xX}) + Z_i \cos (\widehat{zZ})$ and $Z_i = X_i \cos (\widehat{zX}) + Z_i \cos (\widehat{xZ})$ are carried out in the controller N, so that the converted dimensional information $(X_i, z_i)$ (wherein $I=1, 2, \ldots n$) for the tool paths are delivered to regulate the paths. Accordingly, the work having a rotation axis with any given inclination angle $\Delta\theta$ is turned out so that it has the shape initially programed.

In this disclosure, there is shown and described only the preferred embodiments of the invention, but, as aforementioned, it is to be understood that the invention is capable of various changes or modifications within the scope of the inventive concept as expressed herein.

We claim:

1. In a numerically controlled machine tool having a chuck and spindle assembly for supporting a workpiece; a tool slide carrying a plurality of tools; a measuring element on said tool slide; a tape reader for reading programed command information; and a numerical controlling device comprised of a controller for supplying the command information from said tape reader to said tool slide to control the tool paths as well as the revolution of said spindle of the machine tool the selection of the tools and their feed speed, and memory means for memorizing as digital values dimensional deviations measured by the measuring element mounted on said tool slide; the improvement comprising a ring gauge mounted coaxially on said chuck and spindle assembly having a peripheral surface and an end surface constituting measuring surfaces in the transverse and longitudinal directions respectively with respect to the center axis of said spindle, said memory means memorizing the deviations of the center axis of said spindle as signals when the deviations of said measuring surfaces are measured by said measuring element, and means for supplying said memorized deviation signals to said tool slide during succeeding cutting operations for compensating the positions of said tools for detected deviations of the measuring surfaces according to the memorized signals.

2. The improvement as claimed in claim 1 wherein said controlling device comprises means for causing said measuring element to detect the deviations of the dimensions of the machined portions of the work from the programed values and to memorize said deviations of the work dimensions in said memories, and further comprises means for combining the dimensional deviations of the surfaces of said ring gauge and the command information for calculating the starting positions of the tools including the deviations of the measuring surfaces of the ring gauge and the deviations of the machined portions of the work, and for supplying the combined informations to said tool slide at the start of cutting.

3. The improvement as claimed in claim 1 further comprising means for combining the command information and the dimensional deviation of said surfaces of said ring gauge for calculating the paths of the tools during cutting and for supplying the combined information to said tool slide during cutting.

References Cited

UNITED STATES PATENTS

| 2,831,387 | 4/1958 | Oushinsky | 82—14.4X |
| 3,181,401 | 5/1965 | Rice et al. | 82—14.4X |
| 3,191,294 | 6/1965 | Daugherty | 82—14.4X |

FOREIGN PATENTS

| 802,206 | 10/1958 | Great Britain | 90—13 |

LEONIDAS VLACHOS, Primary Examiner

U.S. Cl. X.R.

90—13C; 318—572, 632, 634